(12) United States Patent
Laake

(10) Patent No.: US 8,054,711 B2
(45) Date of Patent: Nov. 8, 2011

(54) METHOD AND APPARATUS FOR ATTENUATION WIND NOISE IN SEISMIC DATA

(75) Inventor: Andreas W. Laake, Kingston (GB)

(73) Assignee: WesternGeco L.L.C., Houston, TX (US)

( * ) Notice: Subject to any disclaimer, the term of this patent is extended or adjusted under 35 U.S.C. 154(b) by 0 days.

(21) Appl. No.: 12/566,879

(22) Filed: Sep. 25, 2009

(65) Prior Publication Data

US 2010/0014383 A1      Jan. 21, 2010

Related U.S. Application Data

(63) Continuation of application No. 11/188,996, filed on Jul. 25, 2005, now Pat. No. 7,616,525.

(51) Int. Cl.
*G01V 1/00* (2006.01)

(52) U.S. Cl. .......................................................... 367/45

(58) Field of Classification Search ............... 367/37–46
See application file for complete search history.

(56) References Cited

U.S. PATENT DOCUMENTS

| 4,972,382 | A | * | 11/1990 | Crider | 367/43 |
| 5,237,538 | A | * | 8/1993 | Linville et al. | 367/38 |
| 5,448,531 | A | * | 9/1995 | Dragoset, Jr. | 367/45 |
| 6,381,544 | B1 | * | 4/2002 | Sallas et al. | 702/17 |
| 6,631,783 | B2 | * | 10/2003 | Khan | 181/108 |
| 6,873,913 | B2 | * | 3/2005 | Choo et al. | 702/17 |

* cited by examiner

*Primary Examiner* — Jack Keith
*Assistant Examiner* — Krystine Breier

(57) ABSTRACT

A method and apparatus for use in seismic prospecting are disclosed. The method includes: attenuating coherent noise in a seismic data set generated from a sweep signal; and correlating the coherent noise-attenuated seismic data set to the sweep signal. The apparatus includes a program storage medium encoded with instructions that, when executed by a computing device perform the method and a computer programmed to perform the method.

21 Claims, 7 Drawing Sheets

US 8,054,711 B2

METHOD AND APPARATUS FOR ATTENUATION WIND NOISE IN SEISMIC DATA

RELATED APPLICATIONS

This application is a continuation of U.S. patent application Ser. No. 11/188,996, filed Jul. 25, 2005 now U.S. Pat. No. 7,616,525, and titled METHOD AND APPARATUS FOR ATTENUATION WIND NOISE IN SEISMIC DATA, the entire disclosure of which is herein incorporated by reference.

BACKGROUND OF THE INVENTION

1. Field of the Invention

The present invention pertains to seismic data acquisition and processing, and, more particularly, to a method and apparatus for attenuating wind noise in seismic data.

2. Description of the Related Art

In a seismic survey, an acoustic or other seismic signal is imparted into a subterranean geological formation. As the signal propagates through the formation, it is reflected back to the surface. Seismic sensors (e.g., geophones, in a land survey) are positioned on the surface to receive the reflections. The reflections are received and converted to data representative of the formation's characteristics and structure. The data is then analyzed to detect the presence of hydrocarbons or other fluids and minerals of interest. Because the cost of extracting such deposits is high, accurate data yielding correct results is highly desired.

Seismic surveys are typically performed in uncontrolled environments. Wind is a common phenomenon with seismic surveys leaving the data degraded with broadband noise. The efficient attenuation of wind noise is therefore of major importance for high quality seismic surveys. Studies of the wind noise have revealed that it has a locally coherent structure. However, when employing vibroseis (i.e., a vibrator powered by a sweep signal) as the seismic source, the data conventionally is correlated without any prior noise attenuation. The internal coherence of the wind noise is therefore destroyed, leaving a pseudo-random noise in the seismic data, which hardly can be removed in processing. More technically, the correlation is performed by a convolution between the survey signal and the resultant seismic data, and the wind noise cannot then be retrieved through deconvolution.

More particularly, wind is a common feature in surface seismic acquisition, especially in desert environments. In general wind is defined by a turbulent flow of air with a turbulent velocity profile above the ground. This means that the average wind velocity increases logarithmically from the ground towards the free air flow.

Observations in the field show that the turbulent flow of air is not a straight movement in layers parallel to the ground. Rather, wind consists of an ensemble of turbulent patches, which move in the average direction of the wind. Within the turbulence patches, the wind imposes a coherent downward pressure on the ground, which in turn is converted into a surface wave. These wind induced, locally coherent, surface waves represent a substantial fraction of wind noise and can not be avoided by burying the geophone.

Conventional seismic recording using vibroseis as a source employs correlation of the geophone with the pilot sweep straight after acquisition. No processing is carried out prior to correlation. The correlation with the pilot sweep, however, has a significant impact on the wind noise. Since wind noise and seismic signal are not correlated, the local phase and amplitude consistency of the wind noise is destroyed. Hence after correlation with the pilot sweep no wind noise filtering based on wind noise coherence can be carried. This implies that all wind noise filtering will result in degradation of the seismic signal.

The present invention is directed to resolving, or at least reducing, one or all of the problems mentioned above.

SUMMARY OF THE INVENTION

The invention comprises a method and apparatus for use in seismic prospecting. In one aspect, the invention is a method comprising: attenuating coherent noise in a seismic data set generated from a sweep signal; and correlating the coherent noise-attenuated seismic data set to the sweep signal. The apparatus includes a program storage medium encoded with instructions that, when executed by a computing device perform the method and a computer programmed to perform the method.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 1:
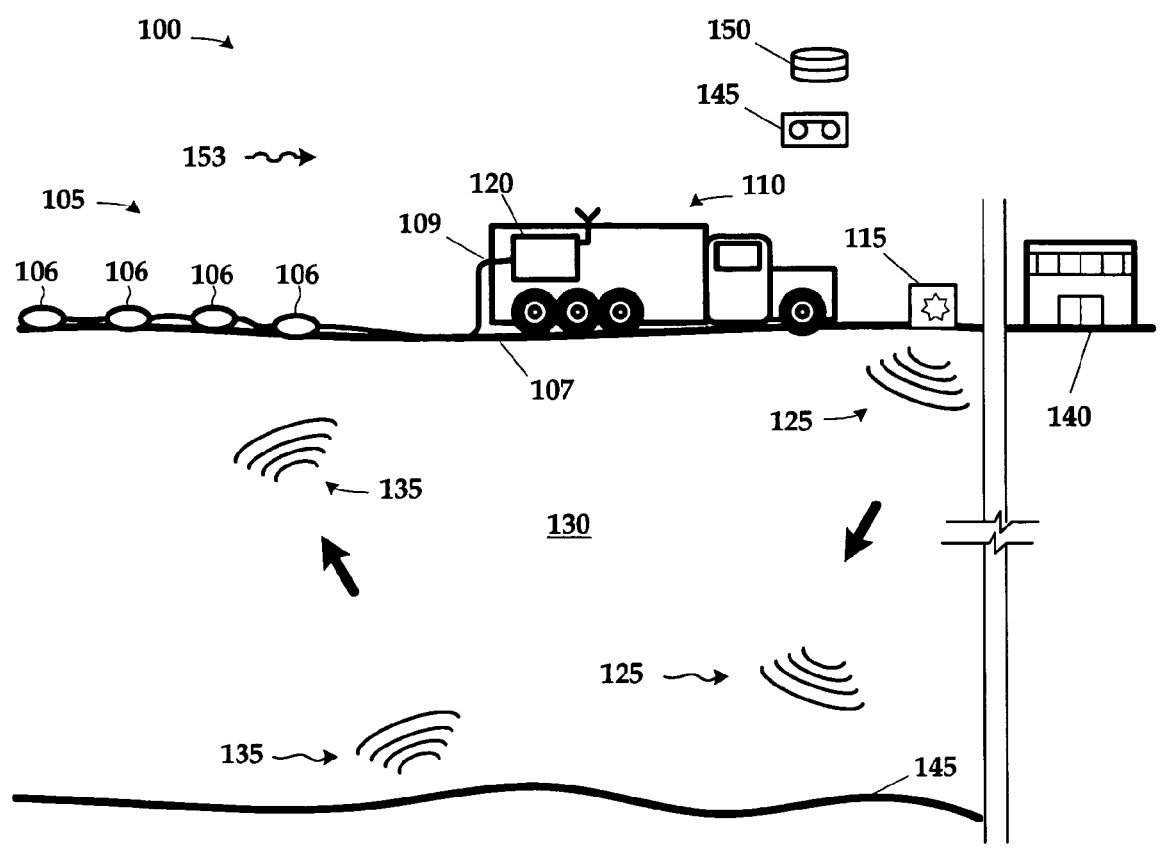
FIG. 1 conceptually depicts a land-based seismic survey in accordance with one particular embodiment of the present invention.

FIG. 1 illustrates a land-based seismic survey employing a seismic survey system 100 by which seismic data may be acquired for processing in accordance with the present invention. The seismic survey system 100 includes a seismic recording array 105 and may be constructed in accordance with conventional practice. The recording array 105 includes a plurality of receivers 106 positioned about an area to be surveyed on the surface 107. The receivers 106 are implemented, in the illustrated embodiment, with, e.g., single geophones as are known to the art. Single geophones are employed to properly record the wind noise signal prior to correlation and avoid wind noise filtering found in conventional geophone arrays based on of phase destruction, which removes the possibility to properly extract the wind noise in true amplitude and phase. Note that the receivers 106 are shown positioned on the surface 107. The receivers 106 may alternatively be buried in some other embodiments. Data collected by the receivers 106 is transmitted over the communications link 109 to a data collection unit 120 in the illustrated embodiment. Note that, in some alternative embodiments, the recording array 105 may transmit data collected by the receivers 106 over a wired connection.

FIG. 1 shows a seismic source 115 and a data collection unit 120 centrally located on the recording truck 110. However, as will be appreciated by those skilled in the art, various portions of the data collection unit 120 may be distributed in whole or in part, e.g., across the seismic recording array 105, in alternative embodiments. The seismic source 115 generates a plurality of seismic survey signals 125 in accordance with conventional practice. The seismic survey signals 125 propagate and are reflected by the subterranean geological formation 130. The receivers 106 receive the reflected signals 135 from the geological formation 130 in a conventional manner. The receivers 106 then generate data representative of the reflections 135, and the seismic data is embedded in electromagnetic signals.

The seismic source 115 is what is known in the art as a "vibroseis source." That is, the seismic survey signals 125 are not impulses, such as would be generated by seismic sources like explosives or air guns. Instead, the seismic survey signals are "sweeps," corresponding to a "pilot sweep" supplied to the seismic source 115. A "sweep" is relatively more complex than an impulse, is typically of longer duration, and usually has a lower amplitude. A sweep distributes the broad spectrum of an impulse over a time window. So, instead of generating all frequencies at once (and providing an impulse) the frequencies are generated one at a time. The resulting—hence, temporally stretched-signal is called a "sweep". Thus, the seismic source 115 may be any vibroseis source known to the art, e.g., a mechanical vibrator. Note also that embodiments may employ multiple vibroseis sources such as the seismic source 115 in arrays using techniques known to the art. Those skilled in the art will realize that the embodiments illustrated herein can be extrapolated to apply the present invention to embodiments employing multiple seismic sources 115.

The signals generated by the receivers 106 are communicated to the data collection unit 120. The data collection unit 120 collects the seismic data for processing. The data collection unit 120 may process the seismic data itself, store the seismic data for processing at a later time, transmit the seismic data to a remote location for processing, or some combination of these things. Typically, processing occurs in camp or at some later time rather than in the recording truck 110 because of a desire to maintain production. The data is therefore stored on a magnetic storage medium, such as a tape 145 or disk array 150, in the recording truck 110 by the data collection unit 120. The magnetic storage medium is then transported to a processing center 140 for processing in accordance with the present invention. Note that some alternative embodiments may employ multiple data collection systems 120.

Figure 2A:
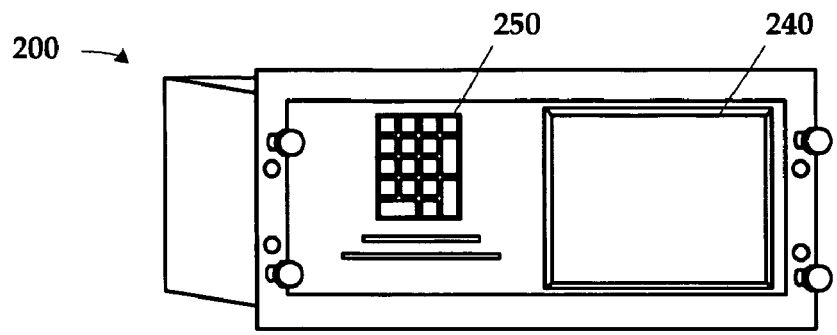
FIG. 2A and FIG. 2B conceptually depict a data collection unit as may be used in the embodiment of FIG. 1.
Figure 2B:
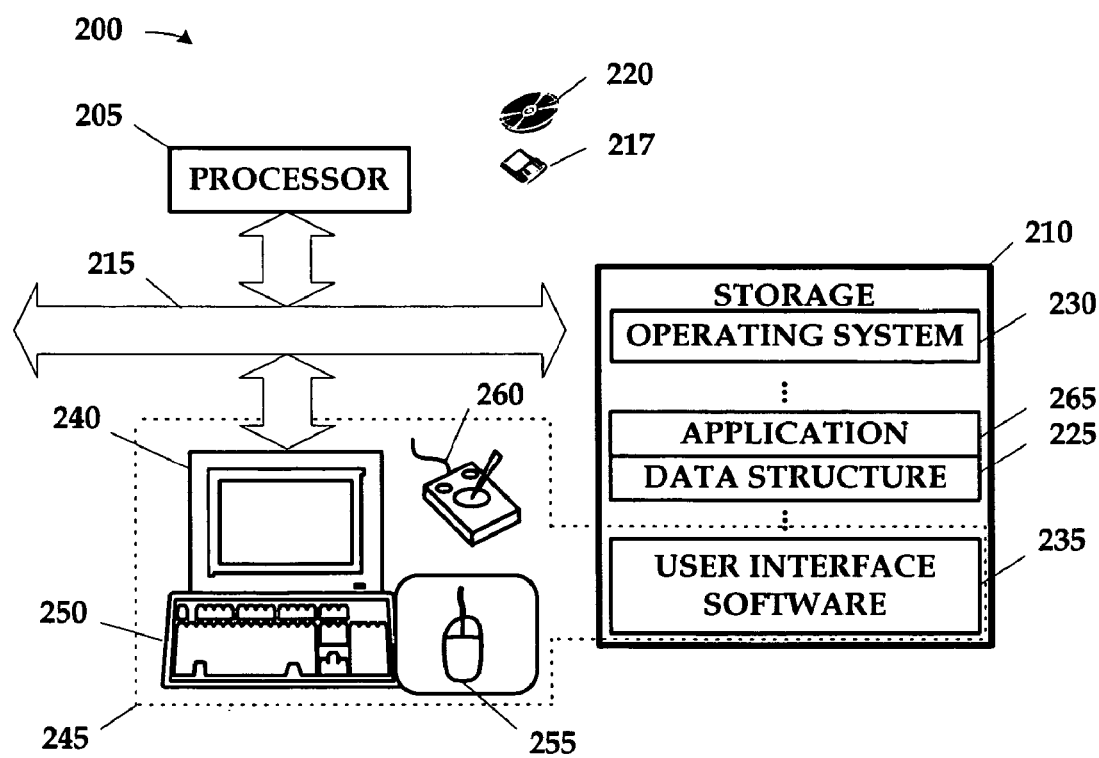

The processing center 140 is equipped with a rack-mounted computing apparatus 200, illustrated in FIG. 2A and FIG. 2B. The computing apparatus 200 includes a processor 205 communicating with storage 210 over a bus system 215. The storage 210 may include a hard disk and/or random access memory ("RAM") and/or removable storage such as a floppy magnetic disk 217 and an optical disk 220. The storage 210 is encoded with a data structure 225 storing the data set acquired as discussed above, an operating system 230, user interface software 235, and an application 265. The user interface software 235, in conjunction with a display 240, implements a user interface 245. The user interface 245 may include peripheral I/O devices such as a keypad or keyboard 250, a mouse 255, or a joystick 260. The processor 205 runs under the control of the operating system 230, which may be practically any operating system known to the art. The application 265 is invoked by the operating system 230 upon power up, reset, or both, depending on the implementation of the operating system 230.

Returning to FIG. 1, the geological formation 130 presents a seismic reflector 145. As those in the art having the benefit of this disclosure will appreciate, geological formations under survey can be much more complex. For instance, multiple reflectors presenting multiple dipping events may be present. FIG. 1 omits these additional layers of complexity for the sake of clarity and so as not to obscure the present invention. The invention may nevertheless be practiced in the presence of such complexity.

Figure 3:
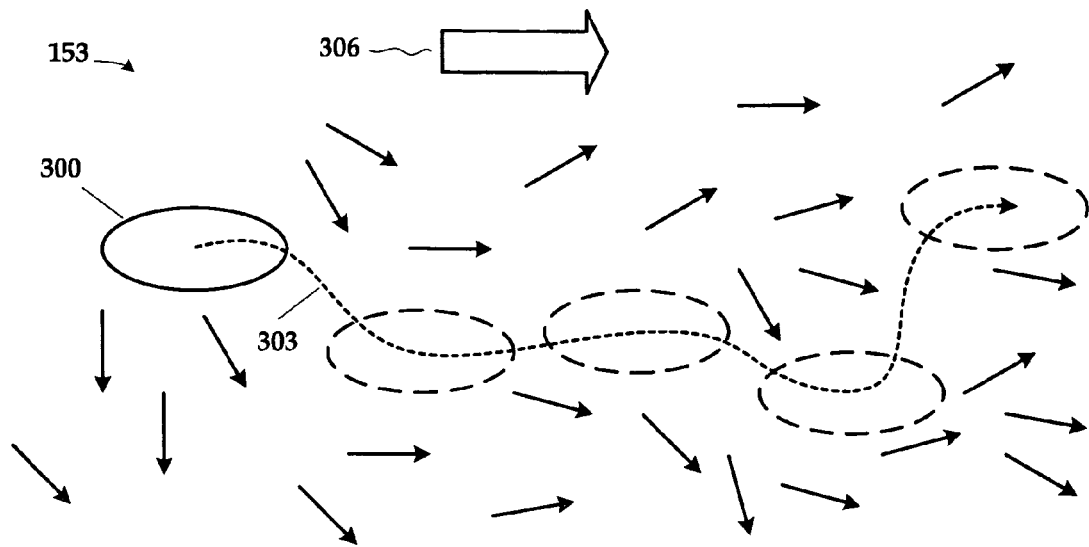
FIG. 3 conceptually illustrates the nature of wind as a plurality of turbulence patches.

The seismic data set acquired as discussed above relative to FIG. 1 is stored in the data structure 225, shown in FIG. 2B. The stored seismic data includes a wind-induced noise component resulting from wind, represented by the graphic 153 in FIG. 1. As was first described above, the wind 153 does not comprise a single, sustained wave of air movement. Instead, the wind 153 comprises a plurality of turbulence patches, such as the turbulence patch 300, shown in FIG. 3. Other turbulence patches and their instantaneous direction of travel are conceptually represented by arrows, the arrow indicating the instantaneous direction of travel for the particular turbulence patch. FIG. 3 also shows an exemplary track 303 of the patch 300 over time illustrating how it does not travel strictly in the average direction 306 of the wind 135.

Figure 4:
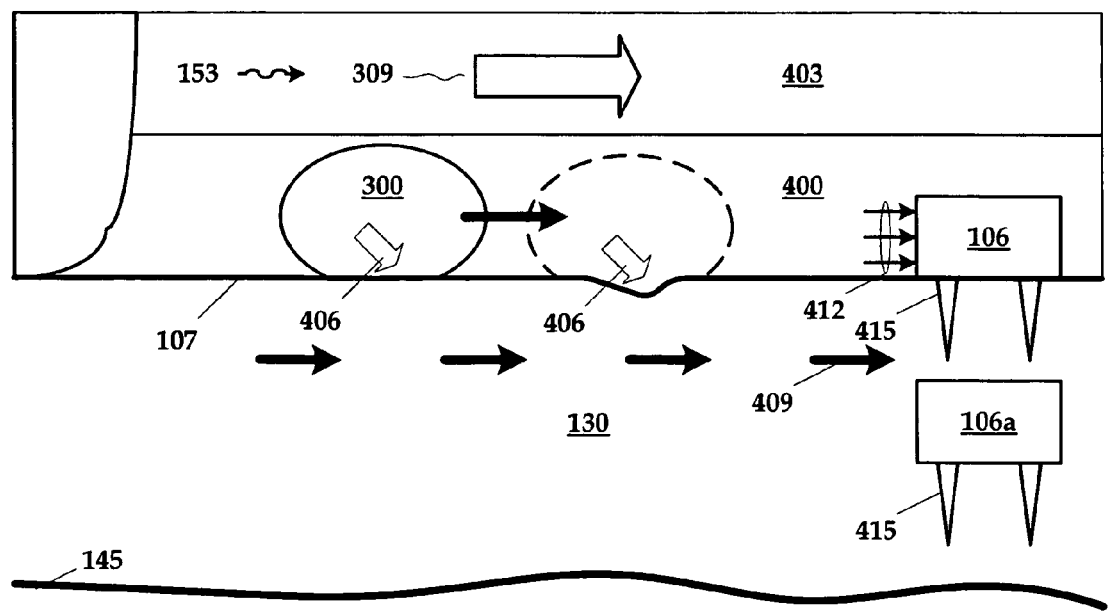
FIG. 4 illustrates the impact of wind and how it induces wind noise into the seismic data acquired through the land-based seismic survey of FIG. 1.

FIG. 4 illustrates the impact of the wind 135 on the individual receivers 106. FIG. 4 also illustrates the wind impact on a buried receiver 106a. The wind 135, in general, creates a two-phase flow zone 400, comprising soil (e.g., sand) and air, intermediate a single-phase flow zone 403, comprising air only, and the ground surface 107. In FIG. 4, the turbulence patch 300 is shown (and its track partially indicated in broken lines) and the downward pressure it exerts is represented by the arrows 406. It is this downward pressure that excites the surface wave, represented by the arrows 409 (only one indicated). Thus, wind noise is induced in the measurements of the surface sensor 106 from the direct impact of the wind 135, represented by the arrows 412, on the sensor 106 and by the surface wave 409 on the spikes 415 (only one indicated) thereof. The buried sensor 106a escapes the direct impact 412, but is still impacted by the surface wave 409. Thus, the data from the buried receiver 106a will also contain wind induced noise.

Figure 5:
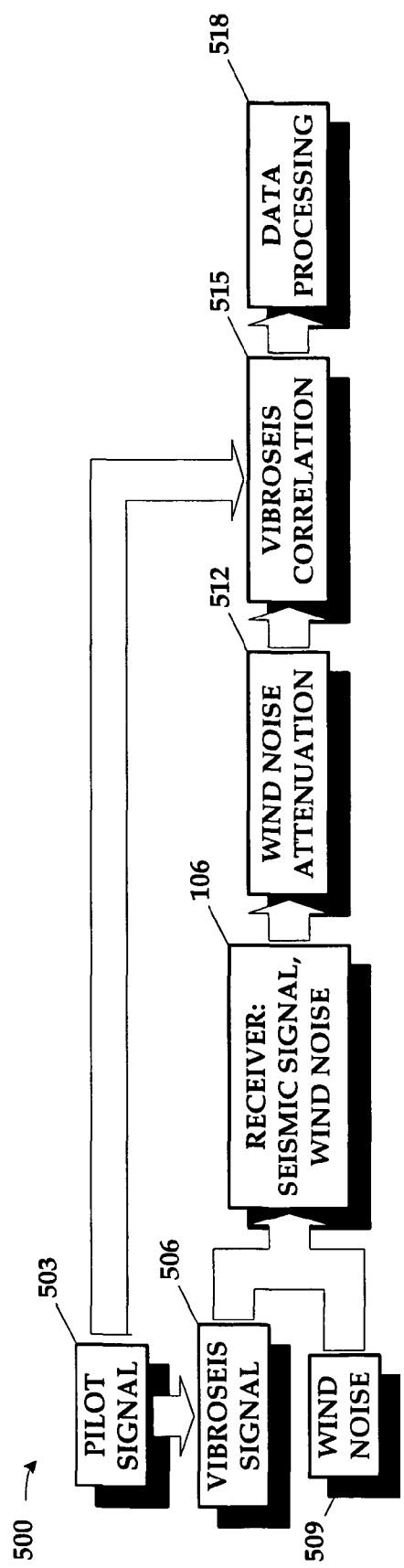
FIG. 5 illustrates the data flow in one particular embodiment of a method in accordance with the present invention.

The seismic data collected as described above and contaminated with the wind-induced noise is then processed in accordance with the present invention. The present invention introduces the filtering of locally coherent wind noise prior to correlation of the vibroseis records, i.e., prior to correlating the seismic data to the sweep signal. FIG. 5 illustrates the data flow 500 in one particular embodiment of a method in accordance with the present invention.

The data flow 500 begins with a pilot signal 503 driving a vibroseis signal 506 in accordance with conventional practice. The vibroseis signal 506 is emitted by the seismic source 115, shown in FIG. 1, as the seismic survey signal 125. The reflections 135 are then received by the receivers 106 along with wind noise 509 as described above. Thus, the receiver 106 generates data including seismic data extracted from the reflections 135 and the wind noise 509.

Figure 6:
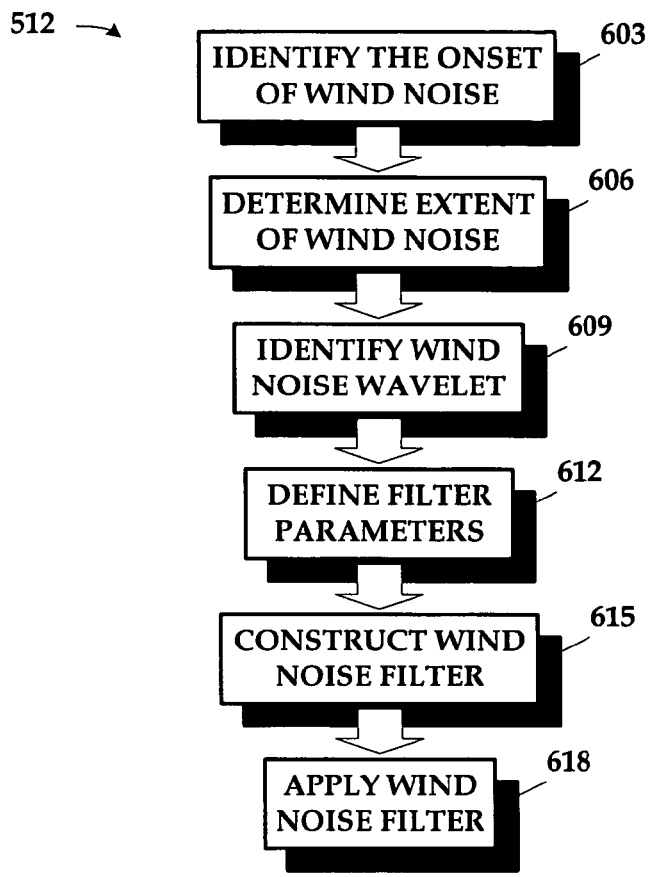
FIG. 6 illustrates a method for attenuating wind noise in seismic data practiced in accordance with the present invention.
Figure 7:
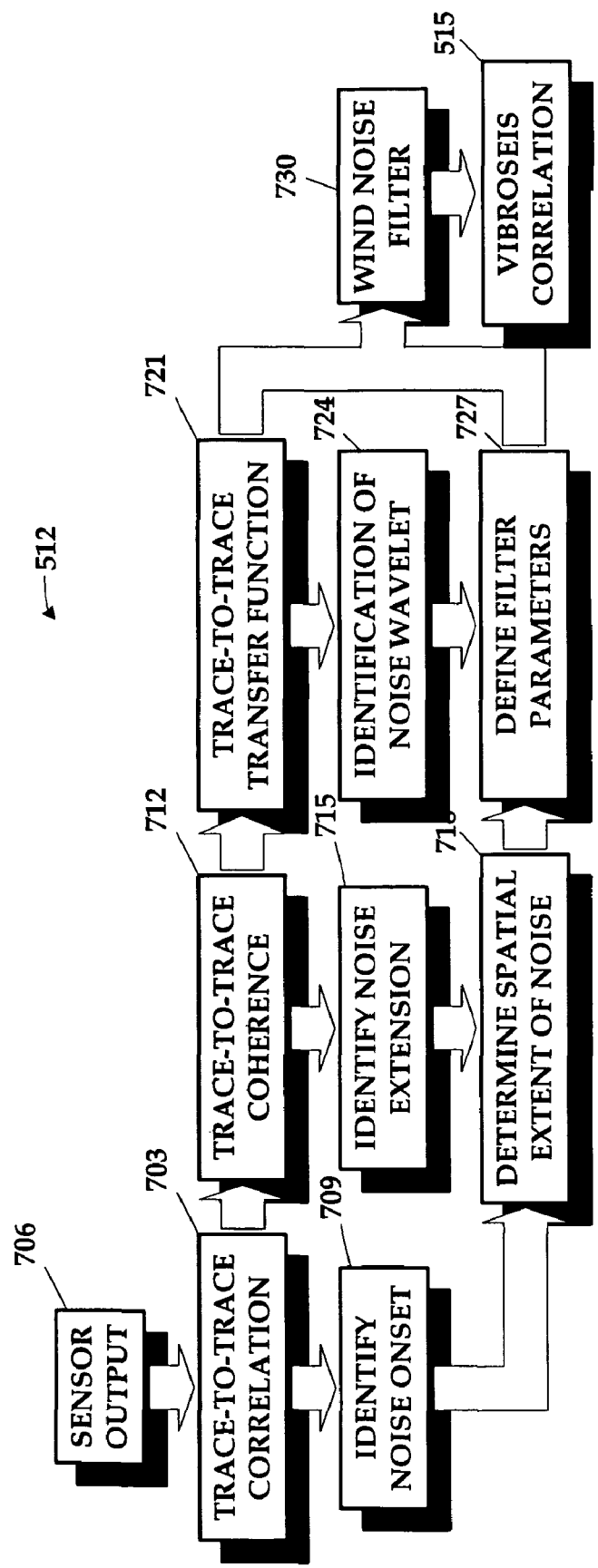
FIG. 7 illustrates one particular embodiment of the method in FIG. 6.

The data flow 500 then performs a wind noise attenuation 512 on the combined seismic data and wind noise. As those in the art having the benefit of this disclosure will appreciate, the seismic data collected as described above is generally treated in "traces." Each trace is the seismic data recorded for one channel, e.g., by one receiver 106, shown in FIG. 1. More technically, a trace is a recording of the Earth's response to seismic energy passing from the source 115, also shown in FIG. 1, through subsurface layers such as those separated by the seismic reflector 145, and back to the receiver 106. The wind noise attenuation 512 involves an analysis of the traces representing the seismic data and wind noise. FIG. 6 and FIG. 7 illustrates how this is done in one particular embodiment.

Referring now to FIG. 6-FIG. 7, the wind noise attenuation 512 begins by identifying (at 603, FIG. 6) the onset of wind noise. The illustrated embodiment identifies the onset, as shown in FIG. 7, by performing a trace-to-trace correlation 703 of the sensor output 706. The correlation is not to the spectra of the traces, but rather to their amplitude, phase and offset. The maximum of the correlation magnitude marks the location where the coherent wind noise onsets and identifies the wind noise onset 709 in the seismic data. Essentially, the trace-to-trace correlation is looking for a jump in the transfer function of the traces. Alternatively, a convolution may be used.

The wind noise attenuation 512 then continues by identifying (at 606, FIG. 6) the extent of the noise. The illustrated embodiment does this through a trace-to-trace coherence analysis 712, in FIG. 7, of neighboring traces in the area contaminated by wind noise. This permits delineation of the areas of the receiver spread, i.e., the portion of the receivers 106, affected by the patch of coherent wind noise. In the illustrated embodiment, the trace-to-trace coherence analysis begins at the point at which the correlation is found in the trace-to-trace correlation 703 marking the noise onset 709. The areas with maximum coherence delineate the areas affected and identify the spatial extent 715 of the wind noise. From the wind noise onset 709 and the wind noise 715, the extent of the wind noise 718 can be identified (at 606, FIG. 6).

The wind noise attenuation 512 also identifies (at 609, FIG. 6) the wind noise wavelet. As is shown in FIG. 7, the wind noise attenuation 512 of the illustrated embodiment employs complex transfer functions 721 as are known to the art to determine at least the magnitude spectrum and the phase of the wind noise. In the illustrated embodiment, the trace-to-trace analysis is performed on those traces originating within the spatial extent 715 identified by the trace-to-trace coherence analysis 712. These characteristics identify the wind noise wavelet 724. If the data quality allows the wavelet of the wind noise may even be determined and used to maximize the efficiency of the wind noise filter.

The wind noise attenuation 512 then defines (at 612, FIG. 6) the filter parameters 727 for a dynamic wind filter 730 from the spatial extent of the wind noise 718 and the wind noise wavelet 724. The geometric extent of the wind noise affected areas and the spectral characteristics provide the information to define the filter parameters for the wind noise filter 730. This could even be enhanced if the wind noise wavelet could be determined as mentioned above. The wind noise filter 730 is then constructed (at 615, FIG. 6) and applied (at 618, FIG. 6) prior to the vibroseis correlation 515. The application (at 618, FIG. 6) of the wind noise filter 730 attenuates the wind noise in the seismic data.

Returning to FIG. 5, once the wind noise attenuation 512 is performed, the data flow 50 continues by performing a vibroseis correlation 515 on the data. The vibroseis correlation 515 correlates the data to the sweep of the vibroseis signal 506. The vibroseis correlation 515 may be performed using techniques well known to the art, the exception being that the techniques are applied to data whose wind noise has previously been attenuated in accordance with the present invention.

The data flow 500 continues by then performing data processing 518. As those in the art having the benefit of this disclosure will appreciate, the nature, performance, and goal of the data processing 518 will be implementation specific. These aspects of the data processing 518 will dependent on a number of well known factors in accordance with conventional practice. The art employs numerous techniques for conditioning and processing seismic and any of these may be employed. The present invention is not limited by the end use, i.e., the data processing 518, to which the data is put.

In the illustrated embodiment, certain portions of the data flow 500 are performed on a computing apparatus, i.e., the computing apparatus 200 in FIG. 2A. More particularly, the wind noise attenuation 512, vibroseis correlation 515, and the data processing 518 are computer implemented. For instance, one or all of these actions may be embodied in the application 265 residing on the storage 210 of the computing apparatus 200. More typically, however, the actions will not be performed in the field, but rather at the processing center 140, shown in FIG. 1.

Figure 8:
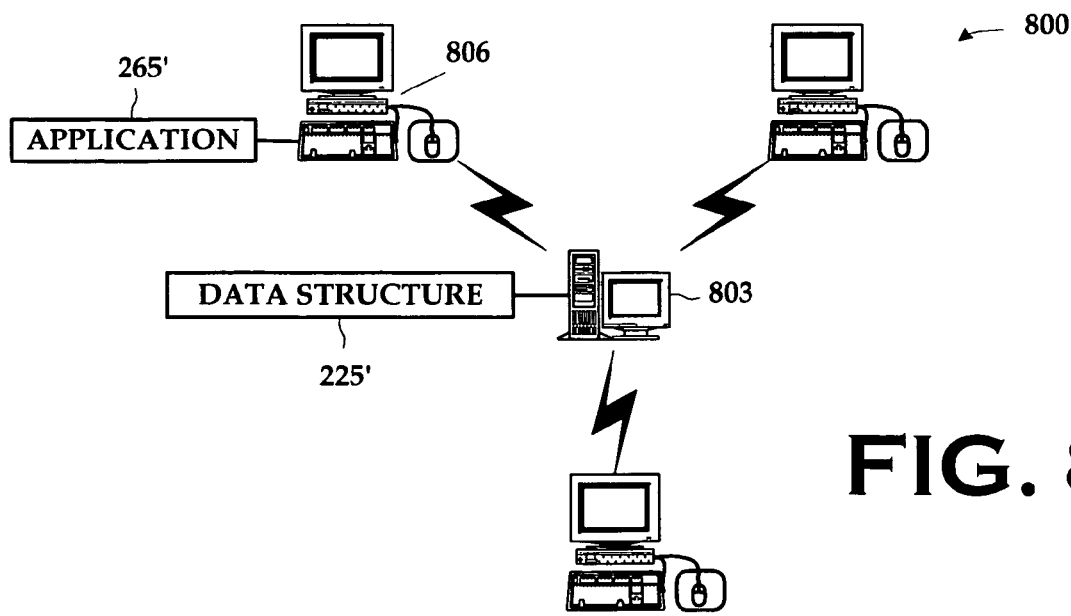
FIG. 8 illustrates a computing system on which some aspects of the present invention may be practiced in some embodiments.

Furthermore, there is no need for the seismic data to reside on the same computing apparatus as the application by which it is processed. Some embodiments of the present invention may therefore be implemented on a computing system, e.g. the computing system 800 in FIG. 8, comprising more than one computing apparatus. For example, the seismic data may reside in a data structure 225' residing on a server 803 and the application 265' by which it is processed on a workstation 806 where the computing system 800 employs a networked client/server architecture. However, there is no requirement that the computing system 800 be networked in all embodiments. Alternative embodiments may employ, for instance, a peer-to-peer architecture or some hybrid of a peer-to-peer and client/server architecture. The size and geographic scope of the computing system 800 is not material to the practice of the invention. The size and scope may range anywhere from just a few machines of a Local Area Network ("LAN") located in the same room to many hundreds or thousands of machines globally distributed in an enterprise computing system.

Thus, some portions of the detailed descriptions herein are consequently presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The illustration of the data flow 500 in FIG. 5 is not meant to indicate that the data flow is performed in a continuous fashion, i.e., relatively contemporaneously, although it could be. Indeed, the wind noise attenuation 512, vibroseis correlation 515, and the data processing 518 may be performed on data that has been archived for years after its acquisition in the field. There may also be considerable time between and among the performance of the wind noise attenuation 512, vibroseis correlation 515, and the data processing 518.

Thus, in alternative embodiments of the data flow 500:
the seismic data may be acquired in the field by the sensor 106, collected on the recording truck 518, and then the wind noise attenuation 512, vibroseis correlation 515, and the data processing 518 performed on the recording truck 110;
the seismic data may be acquired in the field by the sensor 106, collected on the recording truck 518 where the wind noise attenuation 512, vibroseis correlation 515 may be performed before being transmitted to the processing center 140 where the data processing 518 is then performed; or
the seismic data may be acquired in the field by the sensor 106, collected on the recording truck 518, and then transmitted to the processing center 140 where the wind noise attenuation 512, vibroseis correlation 515, and the data processing 518 are performed.

This list of scenarios is neither exhaustive nor exclusive, and other variations may be found in alternative embodiments. The seismic data may be archived at any point in the data flow 500 subsequent to its collection. The only requirement is that the wind noise attenuation 512 be performed prior to the vibroseis correlation 515 to prevent the loss of coherence in the wind noise.

Thus, this embodiment of the present invention employs the local coherence of the wind noise for identification and attenuation of the wind noise in seismic data. The attenuation of the coherent wind noise is carried out prior to correlation of the seismic data with the pilot sweep to maintain the local coherence. Coherence techniques are used to characterize the extent of the wind noise and to extract the wind noise wavelet. It can be expected that this method will provide a significant improvement of the data quality and may permit recording under substantial wind conditions.

The wind noise attenuation methodology discussed above can furthermore be generalized to other forms of coherent noise found in seismic data. As those in the art having the benefit of this disclosure will appreciate, there are usually many sources of coherent noise in environments where seismic surveys are taken. Machinery associated with the operation of drilling rigs, for instance, produces vibration. Many fields have flares to burn off excess product and/or control pressures. Pipelines frequently cross survey areas, and the fluid flow through the pipeline causes what is known as "flow noise". Each of these is a source of coherent noise that, if close enough to the receivers 106, may introduce coherent noise into the seismic data.

Thus, the present invention can be generalized to attenuate coherent noise in the seismic data from these and other sources. Note that incoherent noise is not attenuated under this methodology. Consider, for example, traffic noise originating from a road through the survey area. One vehicle on the road may generate a coherent noise that may be attenuated. However, multiple vehicles will generate noise that is not coherent, and therefore will not be attenuated. Note also that the coherent noise need not be locally coherent in the way that wind noise is locally coherent. However, the coherent noise should be independent of the seismic sweep signal that generates the seismic data. That is, the noise should not be coherent with the seismic sweep signal if it is to be attenuated.

Figure 9:
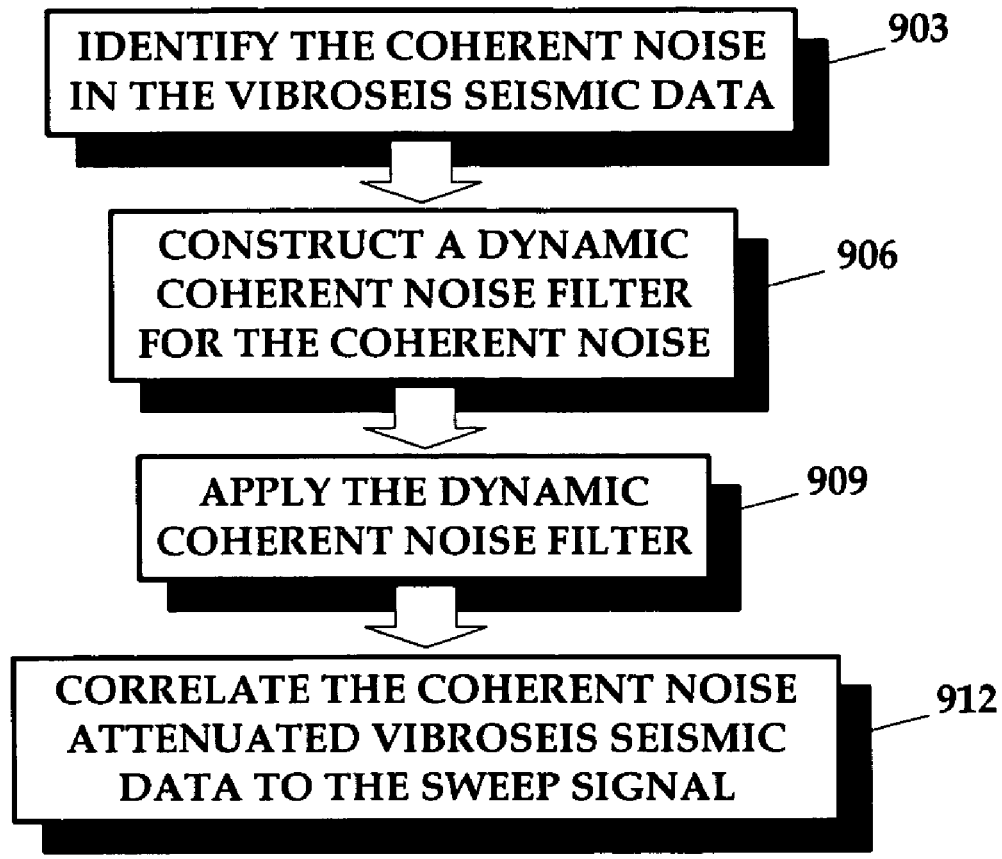
FIG. 9 illustrates a generalized methodology practiced in accordance with one particular embodiment of the present invention.

The methodology can therefore be generalized from locally coherent wind noise, as in the embodiment illustrated above, to essentially any coherent noise found in the seismic data. FIG. 9 illustrates this generalized methodology 900, which begins by identifying (at 903) the coherent noise in the seismic data. This may be done by determining its spatial extent from the onset and extent as was described above for wind noise. The methodology 900 continues by constructing (at 906) a dynamic coherent noise filter for the coherent noise. The dynamic coherent noise filter can be constructed from the geographical extent and the coherent noise wavelet of the coherent noise, also as was described above for wind noise. Finally, the dynamic coherent noise filter is applied (at 909) to attenuate the coherent noise prior to correlating (at 912) the seismic data to the sweep signal.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising:
 performing a trace-to-trace correlation of seismic data to identify an onset of coherent noise in the seismic data;
 identifying a spatial extent of the coherent noise beginning at the onset of the coherent noise;
 attenuating the coherent noise in the seismic data using the spatial extent;
 correlating the attenuated seismic data to a sweep signal used to generate the seismic data; and
 analyzing the correlated and attenuated seismic data, using a computing device, to detect the presence of hydrocarbons in a subterranean geologic formation.

2. The method of claim 1, wherein the coherent noise comprises locally coherent noise.

3. The method of claim 1, wherein the coherent noise comprises noise generated from machine operation, pipeline flow, flare burn-off or combinations thereof.

4. The method of claim 1, wherein attenuating the coherent noise comprises:
 constructing a dynamic coherent noise filter; and
 applying the dynamic coherent noise filter to the seismic data.

5. The method of claim 4, further comprising:
 identifying a coherent noise wavelet; and
 defining a plurality of parameters for the dynamic coherent noise filter from the spatial extent and coherent noise wavelet.

6. A method, comprising:
 identifying a coherent noise wavelet in seismic data by examining a trace-to-trace transfer function of the seismic data;
 identifying an onset of coherent noise in the seismic data;
 identifying a spatial extent of the coherent noise beginning at the onset of the coherent noise;
 attenuating the coherent noise in the seismic data using the spatial extent by:
  defining a plurality of parameters for a dynamic coherent noise filter from the spatial extent and the coherent noise wavelet;
  constructing the dynamic coherent noise filter; and
  applying the dynamic coherent noise filter to the seismic data;
 correlating the attenuated seismic data to a sweep signal used to generate the seismic data; and
 analyzing the correlated and attenuated seismic data, using a computing device, to detect the presence of hydrocarbons in a subterranean geologic formation.

7. The method of claim 1, wherein the spatial extent is identified using an extent of the coherent noise and the onset of the coherent noise.

8. A method, comprising:
 identifying an onset of coherent noise in seismic data;
 identifying a spatial extent of the coherent noise beginning at the onset of the coherent noise by examining a trace-to-trace coherence of the seismic data;
 attenuating the coherent noise in the seismic data using the spatial extent;
 correlating the attenuated seismic data to a sweep signal used to generate the seismic data; and
 analyzing the correlated and attenuated seismic data, using a computing device, to detect the presence of hydrocarbons in a subterranean geologic formation.

9. The method of claim 1, further comprising:
 acquiring the seismic data;
 archiving the seismic data;
 retrieving the seismic data from an archive;
 processing the correlated seismic data; or
 combinations thereof.

10. A program storage medium encoded with instructions that, when executed by a computing device, performs a method comprising:
 identifying an onset of coherent noise in seismic data;
 performing a trace-to-trace coherence analysis on the seismic data beginning at the onset to identify a spatial extent of the coherent noise;
 identifying a coherent noise wavelet;
 attenuating the coherent noise in the seismic data using the spatial extent and the coherent noise wavelet; and
 correlating the attenuated seismic data to a sweep signal used to generate the seismic data.

11. The program storage medium of claim 10, wherein the coherent noise comprises locally coherent noise.

12. The program storage medium of claim 10, wherein the coherent noise comprises noise generated from machine operation, pipeline flow, flare burn-off, or combinations thereof.

13. The program storage medium of claim 10, wherein attenuating the coherent noise comprises:
 constructing a dynamic coherent noise filter using the spatial extent of the coherent noise and the coherent noise wavelet; and
 applying the dynamic coherent noise filter to the seismic data.

14. The program storage medium of claim 10, wherein the method further comprises acquiring the seismic data, archiving the seismic data, retrieving the seismic data from an archive, processing the correlated seismic data, or combinations thereof.

15. A computer system, comprising:
 a processor; and
 a memory comprising program instructions executable by the processor to:
  perform a trace-to-trace correlation of seismic data to identify an onset of coherent noise in the seismic data;
  identify a spatial extent of the coherent noise beginning at the onset of the coherent noise;
  identify a coherent noise wavelet;
  attenuate the coherent noise in the seismic data using the spatial extent and the coherent noise wavelet; and
  correlate the attenuated seismic data to a sweep signal used to generate the seismic data.

16. The computer system of claim 15, wherein the coherent noise comprises locally coherent noise.

17. The computer system of claim 15, wherein the coherent noise comprises noise generated from machine operation, pipeline flow, flare burn-off, or combinations thereof.

18. The computer system of claim 15, wherein the program instructions executable by the processor to attenuate the coherent noise further comprises program instructions executable by the processor to construct a dynamic coherent noise filter using the spatial extent of the coherent noise and the coherent noise wavelet; and to apply the dynamic coherent noise filter to the seismic data.

19. The computer system of claim 15, wherein the memory further comprises program instructions executable by the processor to acquire the seismic data, archive the seismic data, retrieve the seismic data from an archive, process the correlated seismic data, or combinations thereof.

20. The program storage medium of claim 10, wherein performing the trace-to-trace coherence analysis comprises identifying one or more areas having a maximum coherence as the spatial extent.

21. The method of claim 1, wherein the spatial extent comprises a geometric extent of area that the coherent noise affects.

* * * * *